May 26, 1959  E. M. MILLER  2,887,923

TOOL FOR REPAIRING AUTOMOTIVE TRANSMISSIONS

Filed May 3, 1956

INVENTOR.
Eugene M. Miller
BY
Schmieding and Fultz
ATTORNEYS

United States Patent Office 2,887,923
Patented May 26, 1959

2,887,923
TOOL FOR REPAIRING AUTOMOTIVE TRANSMISSIONS

Eugene M. Miller, Columbus, Ohio

Application May 3, 1956, Serial No. 582,376

4 Claims. (Cl. 82—4)

This invention relates to apparatus for repairing automotive transmissions and particularly to a tool for repairing ring grooves on reaction shaft and flange assemblies of such transmissions.

Certain types of automatic transmissions used in automobiles are subjected to a common type of failure. This particular type of transmission incorporates a reaction shaft and flange assembly, of the type illustrated herein, which assembly includes a plurality of ring grooves which receive oil sealing rings which are snapped into the grooves to form a barrier against oil passage. In the course of usage such ring grooves commonly become galded and deformed to the extent that when the transmission is rebuilt new oil sealing rings cannot be installed in the deformed ring grooves and, prior to the present invention, it has been the practice of transmission rebuilders to discard the entire reaction shaft and flange assembly and replace same with a new one at considerable expense.

It is therefore an object of the present invention to provide a novel tool for repairing transmissions of the type described which tool is adapted to precisely reshape and resize deformed ring grooves on assemblies of the above described type.

It is another object of the present invention to provide a novel tool of the type described which tool automatically reforms a ring groove to the proper width and shape for receiving a new snap ring. Hence the repair job can be quickly and accurately accomplished by an unskilled worker.

It is another object of the present invention to provide a novel tool of the type described which can be quickly and accurately centrally located in a plurality of different models of reaction shaft and flange assemblies having central bores of different diameters.

It is still another object of the present invention to provide a tool of the type described which quickly and accurately axially locates a cutter in alignment with each of a plurality of ring grooves on assemblies of the above described type.

It is another object of the present invention to provide a tool of the type described which can be produced from a minimum number of component parts and hence made available to the trade at low cost.

Further objects and advantages of the present invention will be apparent from the following description, reference being had to the accompanying drawings wherein a preferred form of embodiment of the invention is clearly shown.

Figure 1:
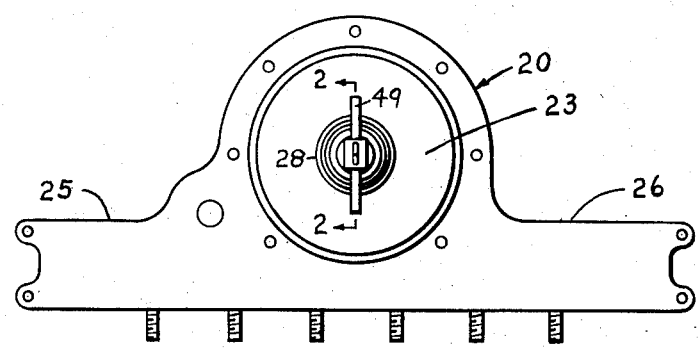
Figure 1 is an end elevational view showing a tool constructed according to the present invention and operatively positioned on a reaction shaft and flange assembly of an automotive transmission.

Referring to the drawing, a reaction shaft and flange assembly is indicated generally at 20 and consists of a hollow reaction shaft 21 secured in a hole 22 of a flange casting 23.

Flange casting 23 includes large outwardly extending side portions 25 and 26 and a centrally located boss 28 through which hole 22 passes. Cylindrical inner bearing 29 and outer bearing 30 are secured to the flange casting 23 at the end of boss 28.

The outer surface 32 of boss 28 is provided with ring grooves 34 and 35 each of which removably receives an oil sealing ring, not illustrated.

The tool of the present invention includes a shaft member indicated generally at 36. Such shaft member includes a bearing portion 37 arranged to fit accurately within holes 59 formed through two bushings indicated generally at 60. One of said bushings 60 is inserted into a bore surface of inner bearing 29 and the other bushing is inserted into the bore surface 38 of reaction shaft 21. An end portion 39 of shaft 36 is disposed outwardly of reaction shaft 21 on one side of flange portion 23 and a bit mounting portion 41 is disposed outwardly of interior bushing 29 on the other side of flange portion 23.

The end portion 39 of shaft 21 is provided with an outwardly tapered guide 43 on the end thereof, and a hole 45 is formed transversely through the shaft member adjacent the other end.

A threaded element 46 is mounted in threaded hole 47 in the end of shaft member 36 and movable into clamping engagement with a radially outwardly disposed leg 49 of a bit member 50.

Bit member 50 further includes an axially disposed leg 51 and a radially inwardly disposed cutter 52 provided with a cutting edge 53. The width of the cutting path defined by cutting edge 53 is substantially equal to the designed original width of ring grooves 34 and 35. Such particular cutting path width is provided since when shoulders 55 at the sides of ring grooves 34 become deformed, so as to flow into the grooves, the grooves become too narrow to receive an oil sealing ring. Hence the width of the cutting path of cutting edge 53 will automatically resize the width of a deformed ring groove so that a new ring can be inserted and function properly as an oil barrier.

Figures 3, 4:
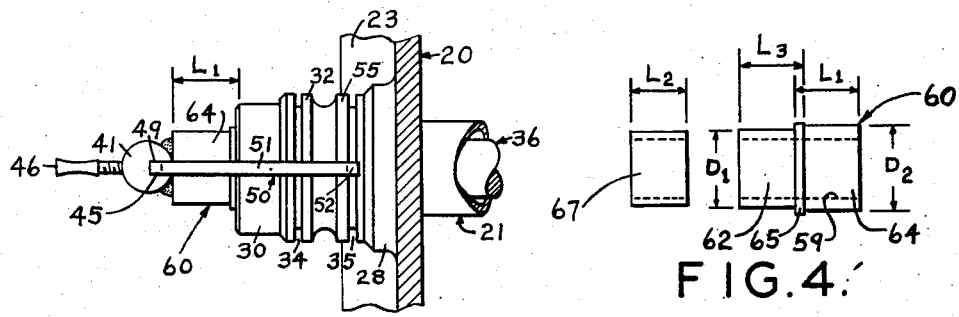
Figure 3 is a partial top view of the tool and assembly of the preceding figures.
Figure 4 is a side elevational view of a spacer and bushing assembly which comprises a portion of the tool of the preceding figures.

As seen in Figure 3, radial leg 49 of bit 50 includes flat side walls and transverse hole 45 includes corresponding flat side walls. This arrangement serves to key the bit 50 in the position illustrated so that it will not twist out of position when cutting forces are being applied.

As best seen in Figure 4, each of the bushings 60 includes an outer surface 62 of diameter D–1 and a second outer surface 64 of a larger diameter D–2. An outwardly disposed shoulder 65 is provided intermediate the surfaces 62 and 64 and arranged to accurately axially locate the bushing to provide the proper length L–1 of extension beyond the end of bearing insert 29 mounted in the end of the bore of the assembly.

Figure 2:
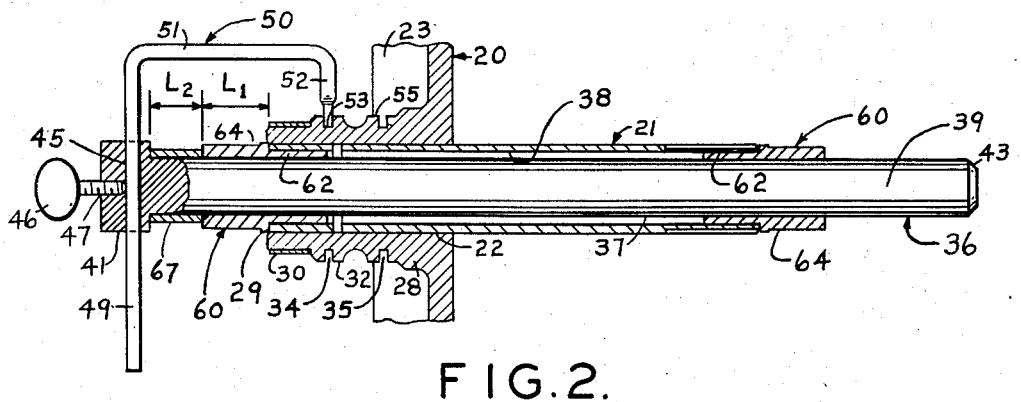
Figure 2 is a side view, partially in section, of the tool and assembly of Figure 1. The section is taken along line 2—2 of Figure 1.

When the smaller diameter surface D–1 is inserted in the assembly, as shown in Figure 2, length L–1 of extension plus the length L–2 of a spacer 67 combine to properly locate cutter 52 relative to outer ring groove 34.

When the spacer 67 is removed, as seen in Figure 3, only the extension L–1 is present and the cutter 52 is accurately located relative to inner ring groove 35.

When it is desired to use the tool to dress the ring grooves of a second different model of transmission which has a certain diameter D–2 of bearing 29 and shaft bore greater than the diameter D–1 of the first model illustrated, the large diameter surfaces 64 are inserted in opposite ends of the bore. The length L-3 of extension of surface 62 plus the length L-2 of spacer 67 will then serve to locate cutter 52 relative to the outer groove of said second model transmission. When spacer 67 is removed, the bushing extension L-3 alone serves to accurately locate cutter 52 relative to the inner groove of said second model of transmission.

The tool can be used to dress the ring grooves of still a third model of transmission which has a flange assembly with a bore diameter D-1 at one end and a smaller bore diameter D-2 at the other end. The longitudinal locations of the ring grooves, however, are the same such that the same bushing extension and length of spacer 67 are proper for use with said third model.

In operation of the tool, the bushings 60 are inserted in the bore of the assembly and shaft member 36 is inserted through. The tapered guide 43 greatly facilitates such insertion in view of the accurate bearing fit between the outer surface of shaft 36 and surfaces 59 of bushings 60. The bit 50 is then inserted in hole 45 and the cutting edge 53 aligned with the entrance of one of the grooves 34 and 35 by use of the bushing extension alone, or the bushing extension plus spacer 67 as previously described. Threaded element 46 is next tightened against leg 49 to clamp same in a configuration wherein cutter 52 can effect cutting action when the shaft member is manually rotated relative to the shaft and flange assembly. The bit member 50 is moved radially inwardly, as required, by loosening threaded element 46, moving leg 49 radially inwardly, and retightening the threaded element against the leg. The shaft member 36 is again manually rotated to effect a deeper cut and the operation is repeated as required.

In rotating the tool to effect cutting action, the end portion 39 can be utilized as a handle, or the radially extending leg 49 of bit 50 can be manually grasped and rotated until the appropriate depth of cut required to dress the grooves has been effected.

While the form of embodiment of the present invention as herein disclosed constitutes a preferred form, it is to be understood that other forms might be adopted, all coming within the scope of the claims which follow.

I claim:

1. In a tool of the type which includes a mandrel and a bit mounted on said mandrel for resizing ring grooves on a work piece provided with a bore, a novel mandrel construction comprising, in combination, a shaft including a bit mounting portion and a shoulder adjacent one end thereof; a bushing on said shaft and abutting said shoulder, said bushing including an outer surface for disposition in said bore, and a protrusion extended outwardly from said outer surface for axially locating said work piece; and adjustable mounting means on said bit mounting portion, said mounting means including a radially extending guide for securing a bit to said portion in various positions of radial extension.

2. In a tool of the type which includes a mandrel and a bit mounted on said mandrel for resizing ring grooves on a work piece provided with a bore, a novel mandrel construction comprising, in combination, a shaft including a bit mounting portion and a shoulder adjacent one end thereof; a bushing on said shaft and abutting said shoulder, said bushing including an outer surface for disposition in said bore, and a protrusion extended outwardly from said outer surface for axially locating said work piece; a second bushing on said shaft, said second bushing including an outer surface for disposition in said bore; and adjustable mounting means on said bit mounting portion, said mounting means including a radially extending guide for securing a bit to said portion in various positions of radial extension.

3. In a tool of the type which includes a mandrel and a bit mounted on said mandrel for resizing ring grooves on a work piece provided with a bore, a novel mandrel construction comprising, in combination, a shaft including a bit mounting portion and a shoulder adjacent one end thereof, said bit mounting portion including a hole the axis of which is disposed transversely of the axis of rotation of said shaft; a bushing on said shaft and abutting said shoulder, said bushing including an outer surface for disposition in said bore, and a protrusion extended outwardly from said outer surface for axially locating said work piece; and a threaded element on said bit mounting portion for clamping said bit member in said hole.

4. In a tool of the type which includes a mandrel and a bit mounted on said mandrel for resizing ring grooves on a work piece provided with a bore, a novel mandrel construction comprising, in combination, a shaft including a bit mounting portion and a shoulder adjacent one end thereof, said bit mounting portion including a hole the axis of which is disposed transversely of the axis of rotation of said shaft; a bushing on said shaft and abutting said shoulder, said bushing including an outer surface for disposition in said bore, and a protrusion extended outwardly from said outer surface for axially locating said work piece; a second bushing on said shaft, said second bushing including an outer surface for disposition in said bore; and a threaded element on said bit mounting portion for clamping said bit member in said hole.

References Cited in the file of this patent

UNITED STATES PATENTS

| | | |
|---|---|---|
| 613,264 | Goddard | Nov. 1, 1898 |
| 812,366 | Ritschard | Feb. 13, 1906 |
| 1,515,636 | Wagner | Nov. 18, 1924 |
| 1,590,201 | McGuckin | Jan. 29, 1926 |
| 1,678,712 | Smith | July 31, 1928 |
| 1,698,862 | Wadell | Jan. 15, 1929 |
| 1,990,270 | Denke | Feb. 5, 1935 |
| 2,438,130 | Schuler | Mar. 23, 1948 |
| 2,537,916 | Rosenboom | Jan. 9, 1951 |
| 2,573,928 | Peter | Nov. 6, 1951 |
| 2,595,541 | Riordan | May 6, 1952 |
| 2,745,306 | Schmidt | May 15, 1956 |